(12) United States Patent  (10) Patent No.: US 7,429,363 B2
Yuan et al.  (45) Date of Patent: Sep. 30, 2008

(54) RISER TERMINATION DEVICE

(75) Inventors: Ed Yuan, Houston, TX (US); Warren Letzsch, Ellicott City, MD (US); Gary Jackson, Katy, TX (US); Jim Evans, Houston, TX (US); John Hood, Harper, TX (US)

(73) Assignee: Stone & Webster Process Technology, Inc., Houston, TX (US)

( * ) Notice: Subject to any disclaimer, the term of this patent is extended or adjusted under 35 U.S.C. 154(b) by 489 days.

(21) Appl. No.: 11/053,482

(22) Filed: Feb. 8, 2005

(65) Prior Publication Data

US 2006/0177357 A1    Aug. 10, 2006

(51) Int. Cl.
F27B 15/08 (2006.01)
B01D 12/00 (2006.01)
B01D 50/00 (2006.01)
B01D 45/00 (2006.01)
C10G 35/00 (2006.01)

(52) U.S. Cl. .................. 422/147; 422/144; 422/145; 210/513; 208/161; 55/315; 55/434

(58) Field of Classification Search ........... 422/144, 422/147, 145; 210/788, 512.2, 787, 513; 208/161, 113, 126, 153; 55/1, 346, 342, 55/343, 345, 349, 459.1, 459.3, 459.4, 460, 55/261, 434, 474, 315; 209/144, 211
See application file for complete search history.

(56) References Cited

U.S. PATENT DOCUMENTS

| | | | |
|---|---|---|---|
| 2,737,479 A | | 3/1956 | Nicholson |
| 2,878,891 A | | 3/1959 | Ross et al. |
| 3,074,878 A | | 1/1963 | Pappas |
| 3,835,029 A | | 9/1974 | Larson |
| 4,288,235 A | | 9/1981 | Gartside et al. |
| 4,348,364 A | | 9/1982 | Gartside et al. |
| 4,433,984 A | | 2/1984 | Gartside et al. |
| 4,666,674 A | * | 5/1987 | Barnes ................. 422/144 |
| 4,721,561 A | * | 1/1988 | Oetiker et al. ........... 209/139.1 |
| 4,756,886 A | | 7/1988 | Pfeiffer et al. |
| 4,961,863 A | * | 10/1990 | Van Den Akker et al. ... 210/788 |
| 5,043,058 A | * | 8/1991 | Forgac et al. ............. 208/48 Q |
| 5,259,855 A | * | 11/1993 | Ross et al. ................. 55/349 |
| 5,662,868 A | * | 9/1997 | Letzsch et al. ............. 422/144 |
| 5,665,130 A | * | 9/1997 | Nielsen et al. ............. 55/307 |
| 5,837,129 A | * | 11/1998 | Ross et al. ................ 208/161 |
| 6,113,777 A | * | 9/2000 | Gauthier et al. ........... 208/161 |
| 6,296,812 B1 | * | 10/2001 | Gauthier et al. ........... 422/144 |
| 6,692,552 B2 | * | 2/2004 | Benham ................... 95/269 |
| 2002/0189452 A1 | * | 12/2002 | Benham ................... 95/269 |

* cited by examiner

Primary Examiner—Walter D. Griffin
Assistant Examiner—Huy-Tram Nguyen
(74) Attorney, Agent, or Firm—Locke Lord Bissell & Liddell, LLP; Alan B. Clement

(57) ABSTRACT

The present invention provides an improved separator for use in hydrocarbon cracking process.

18 Claims, 2 Drawing Sheets

RISER TERMINATION DEVICE

FIELD OF THE INVENTION

The present invention relates to the field of gas-solid separation devices, such as, but not limited to, riser termination devices and, more particularly, to the field of separating mixed phase gas-solid streams in hydrocarbon cracking units.

BACKGROUND OF THE INVENTION

Chemical reaction systems utilizing solids in contact with gaseous or vaporized feedstocks long have been employed in the art. The solids may participate in the reaction as a catalyst; provide heat required for an endothermic reaction; or both. Alternatively, the solids may provide a heat sink required for an exothermic reaction. The terms "solid" and "catalyst" are used interchangeably herein. Similarly, the terms "gas" and "vapors" are used interchangeably herein.

In the past, cracking of petroleum products was performed in fluidized bed reactors that had as an advantage a relatively isothermic temperature profile. However, as catalysts improved and reaction residence times decreased, the bed depth became shallower and increasingly unstable. For this reason, tubular reactors employing solid-gas contact in pneumatic flow were developed and have been used with great success, particularly in the catalytic cracking of hydrocarbons to produce gasoline products where reactor residence time ranges from about 0.5 to about 5 seconds, preferably less than about 2 seconds.

In general, catalytic cracking of relatively high boiling hydrocarbons to form substantial quantities of material boiling in the gasoline range is carried out in the following sequence as described in Pfeiffer et al., U.S. Pat. No. 4,756,886, which is incorporated herein by reference: hot regenerated catalyst is contacted with a hydrocarbon feed in a reaction zone under conditions suitable for cracking; the cracked hydrocarbon gases are separated from the spent catalyst using conventional cyclones and the spent catalyst is steam stripped to remove volatile hydrocarbons and subsequently fed to a regeneration chamber where a controlled volume of air is introduced to burn the carbonaceous deposits from the catalyst, and the regenerated catalyst is returned to the reaction zone.

A problem with these fluidized catalytic cracking systems has been obtaining rapid and efficient separation of the gas and solid phases in order to cease the catalytic cracking and thereby prevent overcracking to less desirable by-products.

Previous attempts have been made in the art to separate the phases by use of centrifugal force and/or deflection means. For example, Nicholson, U.S. Pat. No. 2,737,479, combines reaction and separation steps within a helically wound conduit containing a plurality of complete turns and having product draw-offs on the inside surface of the conduit to separate solids from the gas phase by centrifugal force. Solids accumulate on the outside of the conduit, while gases concentrate at the inner wall, and are removed at the draw-offs. The Nicholson unit produces a series of gas product streams each in a different stage of feed conversion due to the multiple product draw offs that cause varying exposure time of the gas to the reaction conditions.

Ross et al., U.S. Pat. No. 2,878,891, attempted to overcome this defect by appending to a standard riser a modification of Nicholson's separator. Ross et al. '891 teaches a separator comprised of a curvilinear conduit making separation through a 180° to 240° turn. Centrifugal force directs the heavier solids to the outside wall of the conduit allowing gases that accumulate at the inside wall to be withdrawn through a single drawoff. While the problem of various stages of conversion of the product is decreased, other drawbacks of the Nicholson unit are not eliminated.

Both devices effect separation of gas from solids by changing the direction of the gas 90° at the withdrawal point, while allowing solids to flow linearly to the separator outlet. Because solids do not undergo a directional change at the point of separation, substantial quantities of gas flow past the withdrawal point to the solids outlet. For this reason, both devices require a conventional separator at the solids outlet to remove excess gas from the solid particles. However, product gas removed in the conventional separator has remained in intimate contact with the solids, and, therefore, may be degraded.

Another drawback of these devices is the limitation on scale-up to commercial size. As conduit diameter increases, the path traveled by the mixed phase stream increases proportionately so that large diameter units have separator residence times approaching those of conventional cyclones. Increasing velocity can increase residence time, but as velocities exceed 60 to 75 ft/sec, erosion by particles impinging along the entire length of the curvilinear path progressively worsens. Reduction of the flow path length by decreasing the radius of curvature of the conduit also reduces residence time, but increases the angle of impact of solids against the wall, thereby accelerating erosion.

Pappas, U.S. Pat. No. 3,074,878, devised a low residence time separator using deflection means wherein the solid gas stream flowing in a tubular conduit impinges upon a deflector plate causing the solids, which have greater inertia, to be projected away from a laterally disposed gas withdrawal conduit located beneath said deflector plate. Because solids do not change direction while the gas phase changes direction relative to the inlet stream by only 90° there results an inherently high entrainment of solids in the effluent gas. While baffles placed across the withdrawal conduit reduce entrainment, these baffles as well as the deflector plate are subject to very rapid erosion in severe operating conditions of high temperature and high velocity. Thus, many of the benefits of the separators of the prior art are illusory because of the limitations in their efficiency, operable range and scale up potential.

Gartside et al., U.S. Pat. Nos. 4,288,235, 4,348,364 and 4,433,984, disclosed an apparatus for rapidly separating particulate solids from a mixed phase solids-gas stream from tubular type reactors. The Gartside apparatus projects solids by centrifugal force against a bed of solids as the gas phase makes a 180° directional change to effect separation. The solids phase, however, is required to undergo two 90° changes before exiting the apparatus.

Larson, U.S. Pat. No. 3,835,029, discloses a downflow catalytic cracker entering a cylindrical separator with a series of openings in the outside wall through which the hydrocarbon passes. The catalyst solids pass downwardly to a stripper section and then into a regenerator. Within the equipment and spatial constraints, the separator of Larson is limited because there is no progressively increasing lateral flow path as a function of the height of the openings to help effectuate separation once the mixed phase gas solids stream enters the separator.

Pfeiffer, U.S. Pat. No. 4,756,886, teaches a rough cut separator that has a frusto-conical chamber having substantially conical walls tapering downwardly and outwardly and means defining at least one opening in said conical walls for conveying solids free gas.

Other more recent globe-type separators are disclosed in Barnes, U.S. Pat. No. 4,666,674 and Van der Akker et al., U.S. Pat. No. 4,961,863. These references teach the use of a spherical-shaped separator with a tangential entry to reduce pressure drops in the separator.

Special mention is made of Ross, Jr. et al., U.S. Pat. No. 5,837,129, which discloses the original ramshorn-type separator. The Ross, Jr. et al. '129 patent, teaches that employing an inertial type separator at the terminal end of a riser reactor in combination with a horizontally disposed gas oulet with the horizontally disposed gas outlet facing upwardly and toward the riser reactor or upwardly and away from the riser reactor provides a quick and efficient separation of hydrocarbon vapor product from catalyst particles, thereby reducing the post riser reactor contact time between the vapor product and catalyst particles and reducing the post reactor thermal cracking.

Another useful separator is disclosed in Gauthier et al., U.S. Pat. No. 6,113,777, which discloses a direct turn separator for use in fluidized bed thermal cracking or catalytic cracking, also known as a linear disengaging device or $LD^2$. This separator, although providing significant advantages, has proved difficult to operate in a sealed dipleg mode.

Although these separation devices have met with some success, there still exists a need in the art for more improved devices, especially an improved linear disengaging device that can operated in a sealed dipleg mode, with improved solid separation efficiency, reduced vapor underflow from the dipleg and wherein pre-stripping can be provided.

SUMMARY OF THE PRESENT INVENTION

It is an object of the present invention to provide an improved gas-solids separation device.

It is another object of the present invention to provide a gas-solids separation device with improved ability to operate in a sealed dipleg mode.

It is a further object of the present invention to provide a gas-solids separation device that can provide pre-stripping.

It is still another object of the present invention to provide a gas-solids separation device that reduces vapor underflow from the dipleg.

It is still a further object of the present invention to provide an improved gas-solids separation device that is useful in catalytic cracking operations.

It is yet a further object of the present invention to provide an improved gas-solids separation device that is useful in riser catalytic cracking.

It is yet another object of the present invention to provide an improved gas-solids separation device that is useful in thermal particulate cracking operations.

Accordingly, such an improved riser termination device is provided by the present invention. The device of the present invention comprises: (1) an inlet portion for receiving spent solids and cracked product vapors, (2) a turning portion for imparting a centrifugal motion onto said spent solids and cracked product vapors; (3) a vertical portion for receiving the turned spent solids and cracked product vapors and wherein a majority of the vapors with some entrained solids are separated from the majority of the solids; (4) an angular ledge for receiving the majority of the solids, allowing for compaction of the solids and facilitating further separation of vapors; (5) a vapor outlet for receiving the separated vapors with any entrained solids from the vertical portion and the angular ledge; and (6) a dipleg for receiving solids from the angular ledge. In a preferred embodiment, a baffle is provided at a point tangential to and below the vapor outlet, and above the angular ledge to provide a slot between the bottom of the baffle and the angular ledge for passage of the solids, and a gap at the top of the baffle for allowing passage of the vapor separated in the vertical portion.

These and other objects of the invention will be apparent to those of ordinary skill in the art from an inspection of the specification, figures and claims.

DETAILED DESCRIPTION AND DESCRIPTION OF THE PREFERRED EMBODIMENTS

Figure 1:
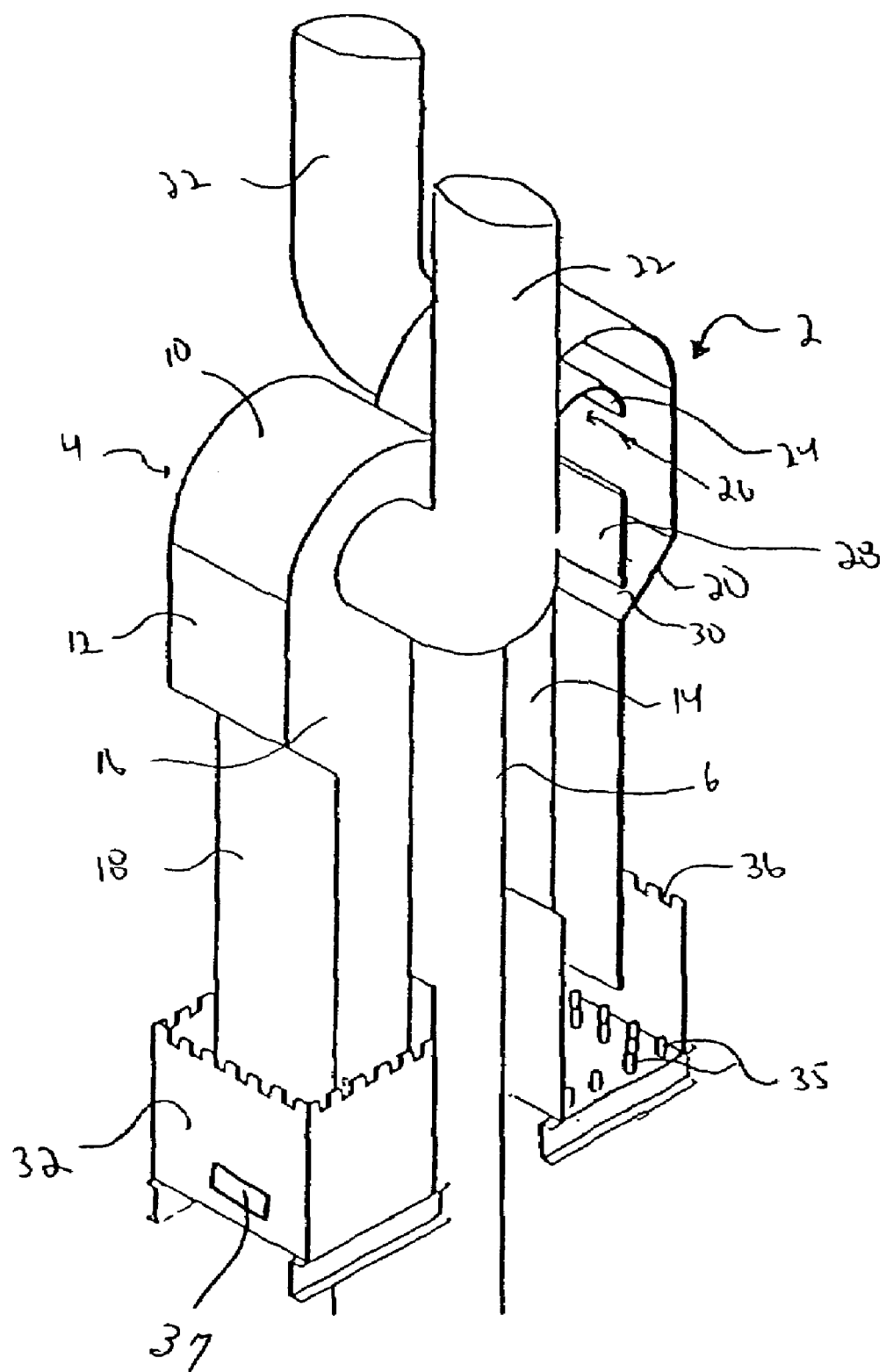
FIG. 1 is depicts a preferred separator of the present invention.

FIG. 1 is a partial cutaway view showing a separator 2 of the present invention. Separator 2 comprises two separating portions 4 centrally positioned atop a riser reactor 6 and separated by a separating wall 8 (see FIG. 2) that extends into the riser reactor 6. Each separating portion 4 is comprised of a semi-circular roof 10, a vertical outside side wall 12, a vertical interior wall 14, a front vertical wall 16, a back vertical wall (not shown), a dipleg 18 and an angled side wall portion 20 connecting vertical outside wall 12 to the dipleg 18. Attached to the front and back vertical walls are gas conduits 22. The bottom of the gas conduit 22 is contiguous with semicircular baffle 24 that extends through the separator 2 leaving an open space 26 below the semicircular portion 24. Attached to the interior of the front and back vertical walls and below the open space is a baffle 28. The baffle 28 is located above the angled side wall portion 20 to leave a gap 30 and is positioned tangential to the outside of semicircular baffle 24. The diplegs 18 extend into a bathtub sealing means 32. Bathtub sealing means 32 is provided with fluidization nozzles 35 and overflow slots 36. Preferably, fluidization nozzles 35 fluidize the particular solids with a stripping gas, such as steam or other stripping gas known to those skilled in the art.

Figure 2:
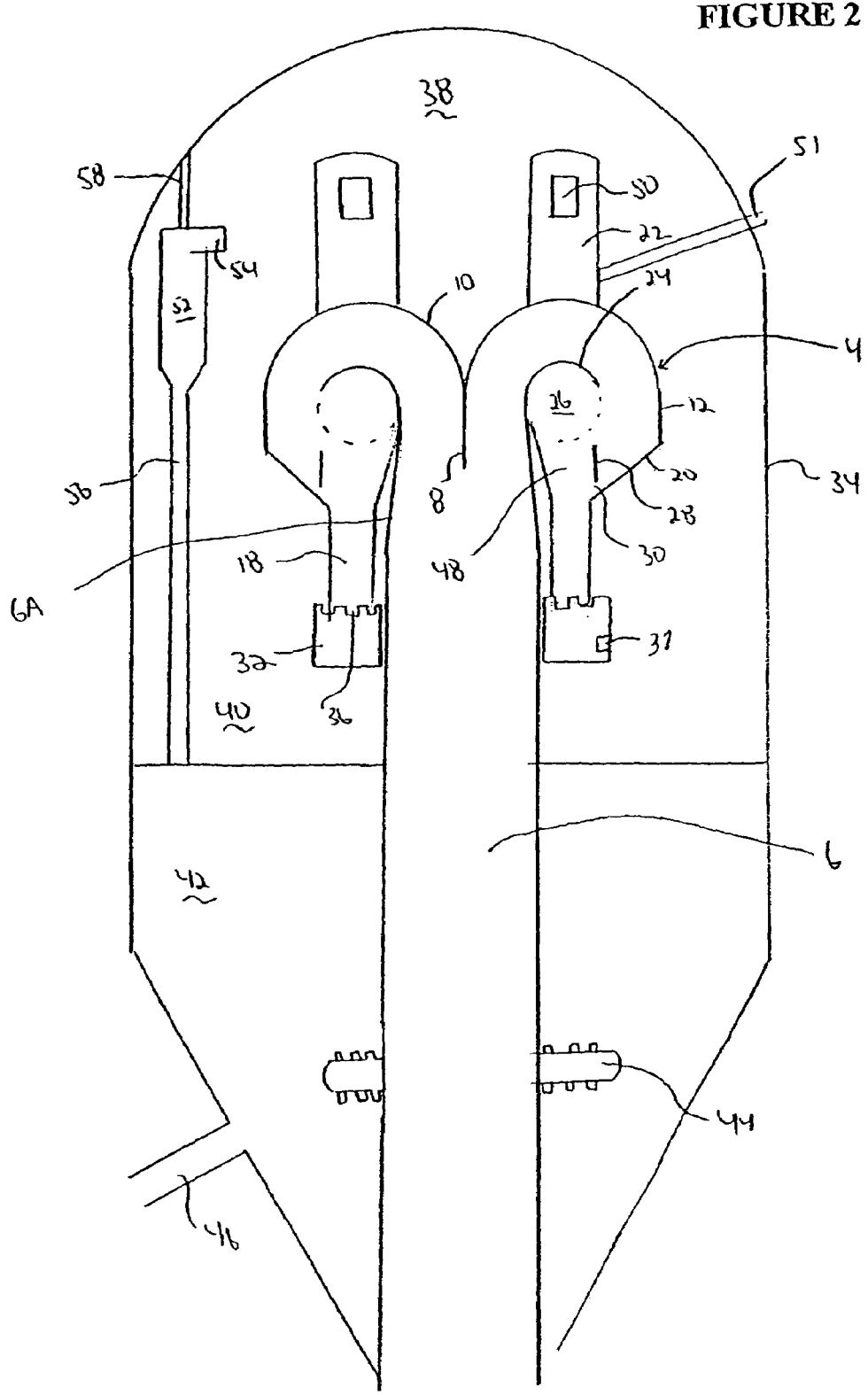
FIG. 2 depicts a preferred separator of the present invention in a riser cracking apparatus.

Referring now to FIG. 2, there is shown a separator of the present invention in the context of a riser reactor 6 that extends centrally into a disengaging vessel 34. Of course, the present invention would have equal applicability to a riser reactor that was external to the disengaging vessel, as will be appreciated by those of ordinary skill in the art. See, e.g., Forgac et al., U.S. Pat. No. 5,043,058. Cracked product and spent catalyst travel upwardly through riser reactor 6. At the top of the riser 6, the cracked product and spent catalyst flow is divided by a wedge-shaped riser separator wall 8. In an embodiment where there is only one separator, there would be no need for the riser separator wall 8. In embodiments where there are three or more separators on top of the riser, the separator wall 8 will take on the shape of a triangular wall and the like.

The top of the riser 6 may be provided with a transition zone 6A as described in U.S. Pat. No. 6,113,777, in which the cross section at the top of the riser is modified, such as being tapered to form a narrowing section, which accelerates the particle mixture between the upper portion of the riser reactor and the separator. The transition zone 6A can have the following functions:

(1) it can modify the shape of the cross section that passes from a substantially circular shape in the reactor to a substantially rectangular or square shape at the inlet to the separator. This rectangular cross section can have a ratio of 1 to 3 between the longest side and the shortest side, the shortest side generally being that which turns about the gas outlet.

(2) It can accelerate the flow to an improved separation velocity by means of a gradual reduction in the cross section in the separator. Preferably the outlet cross section or, in the case where there is a plurality of separators, the sum of the outlet cross sections from the transition zone of each separator can be in the range of 0.5 to one in the cross section of the reactor. Under these conditions, the velocity in the rectangular cross section generally is in the range of from about 10 to about 30 m/s, preferably from about 15 to about 25 m/s, while it is, for example from about 10 to about 25 m/s in the cylindrical cross section of the reactor. The length of the transition zone can be in the range of from about 0.1 to about 10 times the reactor diameter, more preferably from about 0.5 to about 3 times the reactor diameter.

The cracked product and spent catalyst flow enter separator 4 and is then turned centrifugally by an upper semicircular wall 10 and baffle 24. This semicircular portion of the separator, or turning zone, is adapted to rotate the mixture in a vertical plane through an angle, which is less than 360°, preferably in the range of from about 70° to about 225°, and most preferably about 180°. Due to centrifugal forces, the majority of the spent catalyst follows the semicircular contour of upper semicircular wall 10, vertical sidewall 12 and angled sidewall 20. The degree of angle between vertical sidewall 12 and angled sidewall 20 should be such that the spent catalyst easily can slide down the angled sidewall 20, but preferably ranges between about 10° and about 60°. The spent catalyst slides down the angled sidewall 20 (or ledge) and under baffle 28 through slot 30. The baffle 28 is located approximately tangential to the outside of tube opening 26 and the end of baffle 24. The baffle 28 encourages solid and gas separation by causing compaction of the solids at slot 30. Baffle 28 is constructed of a material that is resistant to abrasion and high temperatures, as is known to those skilled in the art. The gap between the bottom of the baffle 28 and angled sidewall 20 preferably ranges from about 6 inches to about 4 feet and the gap between the top of the baffle 28 and the bottom of the tube opening 26 preferably ranges from about 6 inches to about 5 feet.

After passing through slot 30, the spent catalyst exits the separator 4 via a dipleg 18, which generally may have either a circular or rectangular cross-section. The dipleg 18 for use in the present invention must have an open bottom, preferably with no design that restricts solid flow exiting the dipleg 18. In FIG. 2, dipleg 18 is sealed with a bathtub sealing means, which is fluidized. A complete description of bath tub sealing means that are useful in the practice of the present invention is disclosed in commonly assigned U.S. Pat. No. 6,692,552. Steam optionally can be introduced into the dipleg through a suitable means to provide pre-stripping and ensure a fluidized standpipe. In the embodiment of FIG. 2, prestripping also is effected in the bathtub sealing means 32 by the introduction of steam through nozzles 35 (see FIG. 1). The prestripped catalyst exits the bathtub sealing means 32 by overflowing out notches 36 located in the top of the sealing means 32. The prestripped catalyst then falls through the lower portion 40 of the upper dilute phase 38 of disengaging vessel 34 and into the dense fluidized bed 42 for further stripping as is known to those skilled in the art. A portion of the catalyst entering the bathtub sealing means 32 may also pass through openings 37 in the bottom of the bathtub. The dense fluidized bed 42 is fluidized with stripping medium, preferably steam, via fluidization ring 44. Optionally, dense fluidized bed 42 may be packed or equipped with trays (not shown) as is known to those skilled in the art to facilitate stripping. The stripped catalyst then exits the dense fluidized bed 42 via a standpipe 46 for regeneration.

Alternatively, instead of the use of the bath tub sealing means, dipleg 18 can be sealed by extension directly into dense fluidized bed 42 located in the bottom portion of disengaging vessel 34.

As the centrifugal force forces the solids to the outside of the separator, the cracked product vapors peel off from the solids, assisted by baffle 28, and exit the separator above the baffle 28 and below the semicircular portion 24 through opening 26 and into vapor outlet tube 22. Each semicircular section optionally may be provided with two vapor outlet tubes, one on each side of the separator. Additional vapor is removed by compression of the solids at slot 30, which additional vapor proceeds upwardly through space 48 and into opening 26. Optionally, a quench injection means 51, such as a nozzle or other spray device known to those skilled in the art, may be provided in vapor outlet tube 22 to assist in halting any thermal cracking reactions. Any of the quench liquids known to those skilled in the art may be employed in the practice of the present invention, such as, but not limited to those disclosed in the aforementioned Forgac, U.S. Pat. No. 5,043,058. Alternatively, a quench injector may be provided to distributed quench liquid into the upper dilute phase 38 of disengaging vessel 34, such as, for example, in proximity to the vapor outlet port 50. Cracked product vapors, with some entrained solids, exit vapor outlet tube 22 through port 50 and proceed into the upper dilute phase 38 of disengager vessel 34.

Because the primary purpose of the separation device of the present invention it to make a rough cut separation of the catalyst from the cracked product vapors to prevent overcracking, the separator of the present invention is designed to make a rapid separation of a majority of the catalyst particles from the cracked product vapors. As a result, the cracked product vapors leaving the separator are entrained with a minor portion of catalyst particles and fines, which require additional separation. Accordingly, the cracked product vapors with entrained solids are drawn into cyclone separator 52 via entry opening 54. Additionally, steam and stripped volatile hydrocarbons exiting the bath tub sealing means (if present) and the dense catalyst bed 42, with any entrained catalyst particles, also are drawin into the cyclone separator 52. In cyclone 52, the entrained solids are separated from the cracked product vapors. The solids are removed via a dipleg 56 and delivered to the dense fluidized bed 42. Dipleg 56 in FIG. 2 is depicted as unsealed and extending into bed 42, but other arrangements known to those skilled in the art may be employed, such as a sealed dipleg and/or a dipleg that does not extend into bed 42. The cracked product vapors are removed from cyclone 52 via product vapor line 58 and exit the disengager vessel for downstream processing. Although only one cyclone is shown in FIG. 2, it will be appreciated by those skilled in the art and multiple cyclones may be employed to effect the final separation.

The above-mentioned patents are all hereby incorporated by reference.

Many variations of the present invention will suggest themselves to those skilled in the art in light of the above-detailed description. One such option would close couple the outlet tubes 22 to the secondary cyclones 52. This and all such obvious variations are within the full-intended scope of the appended claims.

The invention claimed is:

1. A solids-vapor separation device comprising:
   (1) an inlet portion for receiving a mixed stream of solids and vapors;
   (2) a turning portion for imparting a centrifugal motion onto said solids and said vapors comprising a semi-circular ceiling and a semi-circular floor;
   (3) a vertical portion for receiving said turned solids and said vapors and wherein a majority of the vapors with some entrained solids are separated from the majority of the solids;
   (4) an angular ledge for receiving the majority of the solids located at the bottom of said vertical portion wherein the degree of angle between said vertical portion and said angular ledge ranges between about 10° and 60°, allowing for compaction of the solids and facilitating further separation of vapors;
   (5) a vapor outlet for receiving the separated vapors with any entrained solids from the vertical portion and the angular ledge located below said semicircular floor;
   (6) a dipleg for receiving solids from the angular ledge; and
   (7) a baffle located above said angular ledge, below said vapor outlet and tangential to said vapor outlet, whereby said baffle forms a slot between a bottom portion of the baffle and said angular ledge; a vapor passage for receiving vapors separated from solids flowing through and compacted by said slot and a vapor conduit between an upper portion of said baffle and said semi-circular floor.

2. A device as defined in claim 1 wherein said device is a riser termination device, said vapors comprise cracked product vapors and said solids comprise spent particular solids.

3. A device as defined in claim 1 wherein said dipleg is sealed with a bathtub sealing means.

4. A device as defined claim 1 wherein said dipleg is sealed in a fluidized bed of particular solids.

5. A cracking apparatus comprising:
   (a) a disengaging vessel comprising an upper dilute zone and a lower dense zone;
   (b) a riser reactor for cracking a hydrocarbon feedstock in the presence of hot particulate solids, said riser reactor having an outlet for producing a riser effluent comprising spent solids and cracked product vapors; and
   (c) a separation device comprising:
      (i) an inlet for receiving the riser effluent;
      (ii) a turning zone for imparting centrifugal force onto the riser effluent, said turning zone comprising a curved ceiling and curved floor;
      (iii) a vertical zone for receiving effluent from the turning zone; said vertical zone allowing for a majority of said spent solids to separate from the majority of said cracked product vapors as a result of the centrifugal force provided by said turning zone;
      (iv) an angled ledge for receiving the majority of said spent solids from said vertical zone, wherein the degree of angle between said angled ledge and said vertical zone ranges from about 10° to about 60°, and allowing for compaction of said spent solids and further separation of cracked product from said spent solids;
      (v) a dipleg for receiving the spent solids from said angled ledge and for delivering said spent solids to a fluidized zone;
      (vi) a vapor outlet for receiving cracked product vapors from said vertical zone and said angled ledge and delivering said cracked product vapors to the upper dilute zone of said disengaging vessel; and
      (vii) a baffle located above said angular ledge, below said vapor outlet and tangential to said vapor outlet, whereby said baffle forms a slot between a bottom portion of the baffle and said angular ledge; a vapor passage for receiving vapors separated from solids flowing through and compacted by said slot and a vapor conduit between an upper portion of said baffle and said semi-circular floor.

6. A cracking apparatus as defined in claim 5 wherein said cracking apparatus is a catalytic cracking apparatus and said hot particulate solids comprise cracking catalyst.

7. A cracking apparatus as defined in claim 5 wherein said cracking apparatus is a thermal particulate cracking apparatus and said hot particulate solids comprise substantially inert particulates.

8. A cracking apparatus as defined in claim 5 wherein said riser reactor is provided with a transition zone at the tope of said riser reactor.

9. A cracking apparatus as defined in claim 8 wherein said transition zone modifies the shape of the cross section from a substantially circular shape in the reactor to a substantially rectangular or square shape at the inlet to said separation device.

10. A cracking apparatus as defined in claim 8 wherein said transition zone provides a gradual reduction in the cross section of said riser reactor to said inlet to said separation zone.

11. A cracking apparatus as defined in claim 5 wherein said cracking apparatus comprises two or more of said separation devices.

12. A cracking apparatus as defined in claim 11 wherein said separation device further comprises a wall that extends into the top of said riser reactor for splitting the flow into each of said separation devices.

13. A cracking apparatus as defined in claim 12 wherein there are two separation devices and said wall is wedge-shaped.

14. A cracking apparatus as defined in claim 12 wherein there are three separation devices and said wall has a triangular cross-section.

15. A cracking apparatus as defined in claim 5 wherein said dipleg is sealed with a bath tub sealing means.

16. A cracking apparatus as defined in claim 5 wherein said dipleg is sealed in a fluidized bed of particulate solids located in said dense bed of said disengaging vessel.

17. A cracking apparatus as defined in claim 15 wherein said bathtub sealing means is fluidized with a stripping gas.

18. A cracking apparatus as defined in claim 5 further comprising a quenching means located to quench cracked products in said vapor product outlet.

* * * * *